(12) United States Patent
Wang et al.

(10) Patent No.: US 11,089,557 B2
(45) Date of Patent: Aug. 10, 2021

(54) INFORMATION INDICATION APPARATUS AND METHOD AND COMMUNICATION SYSTEM

(71) Applicant: FUJITSU LIMITED, Kawasaki (JP)

(72) Inventors: Xin Wang, Beijing (CN); Weiwei Wang, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/266,907

(22) Filed: Feb. 4, 2019

(65) Prior Publication Data

US 2019/0182782 A1  Jun. 13, 2019

Related U.S. Application Data

(63) Continuation of application No. PCT/CN2016/094902, filed on Aug. 12, 2016.

(51) Int. Cl.
*H04W 56/00* (2009.01)
*H04J 3/00* (2006.01)
*H04W 16/28* (2009.01)
*H04W 72/04* (2009.01)

(52) U.S. Cl.
CPC ............ *H04W 56/001* (2013.01); *H04J 3/00* (2013.01); *H04W 16/28* (2013.01); *H04W 56/00* (2013.01); *H04W 56/0065* (2013.01); *H04W 72/046* (2013.01); *H04W 72/0446* (2013.01)

(58) Field of Classification Search
None
See application file for complete search history.

(56) References Cited

U.S. PATENT DOCUMENTS 9,894,624 B2  2/2018  Yu et al.
10,284,320 B2  5/2019  Frenne et al.
(Continued)

FOREIGN PATENT DOCUMENTS

CN   101425991 A   5/2009
CN   104982071 A   10/2015
(Continued)

OTHER PUBLICATIONS

Notification of Reasons for Refusal by the Japan Patent Office issued for corresponding Japanese Patent Application No. 2019-506093, dated Mar. 31, 2020, with an English translation.

(Continued)

*Primary Examiner* — Gregory B Sefcheck
*Assistant Examiner* — Amarnauth G Persaud
(74) *Attorney, Agent, or Firm* — Myers Wolin, LLC

(57) ABSTRACT

An information indication apparatus and method and a communication system. The information indication method includes: transmitting a plurality of physical broadcast channels and a plurality of synchronization signals at a plurality of time units or a plurality of time instances within a time interval; wherein, each of the physical broadcast channels carries timing information of the time interval. Hence, even a plurality of physical broadcast channels and a plurality of synchronization signals are transmitted at a plurality of time units or a plurality of time instances within a time interval, the timing information of the time interval may be obtained with a simple structure and operation.

18 Claims, 9 Drawing Sheets

(56) References Cited

U.S. PATENT DOCUMENTS

| | | | |
|---|---|---|---|
| 2013/0195069 A1* | 8/2013 | Frederiksen | H04W 48/12 370/330 |
| 2013/0196659 A1* | 8/2013 | Damji | H04W 52/0225 455/434 |
| 2014/0226638 A1 | 8/2014 | Xu et al. | |
| 2015/0103800 A1 | 4/2015 | Seo et al. | |
| 2015/0319701 A1 | 11/2015 | Ng et al. | |
| 2015/0341908 A1* | 11/2015 | Wang | H04L 5/0053 370/312 |
| 2016/0294528 A1* | 10/2016 | Kim | H04L 5/0094 |
| 2016/0308637 A1 | 10/2016 | Frenne et al. | |
| 2017/0245156 A1 | 8/2017 | Gou et al. | |
| 2017/0353257 A1* | 12/2017 | Islam | H04L 27/2657 |
| 2018/0176065 A1* | 6/2018 | Deng | H04B 7/0695 |
| 2019/0028222 A1* | 1/2019 | Frenne | H04W 56/0015 |
| 2019/0173517 A1* | 6/2019 | Zhang | H04W 56/004 |

FOREIGN PATENT DOCUMENTS

| | | |
|---|---|---|
| CN | 105207754 A | 12/2015 |
| CN | 105723639 A | 6/2016 |
| EP | 2 941 072 A1 | 11/2015 |
| JP | 2014-532320 A | 12/2014 |
| WO | 2011/076074 A1 | 6/2011 |
| WO | 2015/080646 A1 | 6/2015 |
| WO | 2016/057193 A1 | 4/2016 |

OTHER PUBLICATIONS

International Search Report issued by the State Intellectual Property Office of the P.R. China for corresponding International Patent Application No. PCT/CN2016/094902, dated Apr. 7, 2017, with an English translation.

Written Opinion of the International Searching Authority issued for corresponding International Patent Application No. PCT/CN2016/094902, dated Apr. 7, 2017, with an English translation.

First Notification of Office Action and Search Report issued by the China National Intellectual Property Administration or corresponding Chinese Patent Application No. 201680088079.5, dated Dec. 27, 2019, with an English translation.

Extended European search report with supplementary European search report and the European search opinion issued by the European Patent Office for corresponding European Patent Application No. 16912370.0, dated Feb. 7, 2020.

* cited by examiner

INFORMATION INDICATION APPARATUS AND METHOD AND COMMUNICATION SYSTEM

CROSS REFERENCE TO RELATED APPLICATIONS

This application is a continuation application of International Application PCT/CN2016/094902 filed on Aug. 12, 2016, the entire contents of which are incorporated herein by reference.

TECHNICAL FIELD

This disclosure relates to the field of communication technologies, and in particular to an information indication apparatus and method and a communication system.

BACKGROUND

For a high-frequency wireless communication system, such as a band of a centimeter wave or a millimeter wave, due to limitation of physical propagation features, wireless signals are attenuated very fast as increase of distances. A fifth generation (5G) or new radio (NR) system will adopt such carriers higher than 6 GHz to constitute a cellular communication system. And how to improve coverage of a cell is a challenge.

Use of a multi-antenna technique for beamforming may greatly improve a transmission distance of a high-frequency radio wave. For example, use of a so-called massive multiple input multiple output (MIMO) technique may obtain more outstanding antenna gains.

By performing beamforming or precoding on data transmitted to a user equipment, a user equipment relatively far away from a base station is enabled to receive signals of sufficiently good quality, thereby improving transmission distances of data signals. However, for those signals needing to be received by all user equipments within a cell, such as a system signal (or system information), a synchronization signal, a control signal, and a measurement signal related to radio resource management, etc., there exists a problem of wide coverage. For the convenience of description, such signals are referred to as cell signals in brief.

After beamforming is used, different from a scheme of isotropic antenna, sufficiently strong signals can be received only in a direction to which a beam directs. In order that all user equipments within a cell may reliably receive cell signals, a manner of beam sweeping may be adopted. For the cell signals, the beamforming technique is adopted, so that beams are sequentially transmitted in different spatial directions at a plurality of time units within a time interval in a time-division manner. Hence, the cell signals in this time interval may cover an expected spatial range, such as the whole cell or the whole sector.

The synchronization signal is one of most important signals in the cell signals, and is a necessary signal for a user equipment to access to the network and move in the network. Seen from a frame structure, for a long-term evolution (LTE) system or an LTE-advance system, only one synchronization signal is transmitted at a certain time interval (such as half a frame, 5 ms, or one frame, 10 ms), hence, a receiver may determine timing (such as frame timing) of the time interval according to a detected position of the synchronization signal.

It should be noted that the above description of the background is merely provided for clear and complete explanation of this disclosure and for easy understanding by those skilled in the art. And it should not be understood that the above technical solution is known to those skilled in the art as it is described in the background of this disclosure.

Summary

However, it was found by the inventors that for example, when beam sweeping is used, the synchronization signal is possibly transmitted for multiple times at a plurality of time instances or a plurality of time units at a time interval (such as a subframe) by using a plurality of beams. Hence, after determining a position of the synchronization signal by using a detection algorithm, the receiver further needs to accurately learn a beam to which the synchronization signal corresponds, or needs to learn a time instance or a time unit to which the detected synchronization signal corresponds in the beam sweeping process. Only in this way timing information of a time interval (such as a subframe or frame) can be further extrapolated.

For an NR system, synchronization signals may possibly be redesigned, and a new transmission time interval (TTI) type or name may possibly be defined; however, for beam sweeping, all user equipments need to detect synchronization signals and obtain a starting time instance of a transmission time interval.

And on the other hand, acquisition of the most important system information is an important part of initial access. In the LTE system, master information block (MIB) information is carried in a physical broadcast channel, and includes information necessary for a terminal to access a network, such as a system frame number (SFN), and a system bandwidth, etc. A new physical broadcast channel may possibly be designed in the NR; however, if a synchronization signal adopts the beam sweeping manner, the physical broadcast channel will also adopt the same manner in transmission.

Embodiments of this disclosure provide an information indication apparatus and method and a communication system, in which even a plurality of physical broadcast channels and a plurality of synchronization signals are transmitted at a plurality of time units or a plurality of time instances within a time interval, the timing information of the time interval can be obtained with a simple structure and operation.

According to a first aspect of the embodiments of this disclosure, there is provided an information indication method, applicable to a transmitting device, the information indication method including:

transmitting a plurality of physical broadcast channels and a plurality of synchronization signals at a plurality of time units or a plurality of time instances within a time interval; wherein, each of the physical broadcast channels carries timing information of the time interval.

According to a second aspect of the embodiments of this disclosure, there is provided an information indication apparatus, configured in a transmitting device, the information indication apparatus including:

an information transmitting portion configured to transmit a plurality of physical broadcast channels and a plurality of synchronization signals at a plurality of time units or a plurality of time instances within a time interval; wherein, each of the physical broadcast channels carries timing information of the time interval.

According to a third aspect of the embodiments of this disclosure, there is provided an information indication method, applicable to a receiving device, the information indication method including:

detecting synchronization signals transmitted by a transmitting device; wherein, the transmitting device transmits a plurality of physical broadcast channels and a plurality of synchronization signals at a plurality of time units or a plurality of time instances within a time interval, and each of the physical broadcast channels carries timing information of the time interval;

receiving corresponding physical broadcast channels according to the detected synchronization signals; and obtaining the timing information of the time interval carried by the physical broadcast channel.

According to a fourth aspect of the embodiments of this disclosure, there is provided an information indication apparatus, configured in a receiving device, the information indication apparatus including:

a synchronization signal detecting portion configured to detect synchronization signals transmitted by a transmitting device; wherein, the transmitting device transmits a plurality of physical broadcast channels and a plurality of synchronization signals at a plurality of time units or a plurality of time instances within a time interval, and each of the physical broadcast channels carries timing information of the time interval;

an information receiving portion configured to receive corresponding physical broadcast channels according to detected synchronization signals; and a timing obtaining portion configured to obtain the timing information of the time interval carried by the physical broadcast channel.

According to a fifth aspect of the embodiments of this disclosure, there is provided a communication system, including:

a transmitting device configured to transmit a plurality of physical broadcast channels and a plurality of synchronization signals at a plurality of time units or a plurality of time instances within a time interval; wherein, each of the physical broadcast channels carries timing information of the time interval; and a receiving device configured to detect the synchronization signals transmitted by the transmitting device, receive corresponding physical broadcast channels according to detected synchronization signals, and obtain the timing information of the time interval carried by the physical broadcast channel.

An advantage of the embodiments of this disclosure exists in that a plurality of physical broadcast channels and a plurality of synchronization signals are transmitted at a plurality of time units or a plurality of time instances within a time interval; each of the physical broadcast channels carries timing information of the time interval. Hence, even a plurality of physical broadcast channels and a plurality of synchronization signals are transmitted at a plurality of time units or a plurality of time instances within a time interval, the timing information of the time interval may be obtained with a simple structure and operation.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprise/include" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals assign corresponding parts throughout the several views and may be used to assign like or similar parts in more than one embodiment.

DETAILED DESCRIPTION

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

In this disclosure, a base station may be referred to as an access point, a broadcast transmitter, a transmission reception point (TRP), a node B, or an evolved node B (eNB), etc., and may include some or all functions of them. A term "base station" shall be used in the text, and each base station provides communication coverage for a specific geographical region. And a term "cell" may refer to a base station and/or its coverage area, which is dependent on a context of the term.

In this disclosure, a mobile station or equipment may be referred to as a user equipment (UE). The UE may be fixed or mobile, and may also be referred to as a mobile station, a terminal, an access terminal, a user unit, or a station, etc. The UE may be a cellular phone, a personal digital assistant (PDA), a wireless modem, a wireless communication device, a handhold device, a machine type communication device, a lap-top computer, and a cordless telephone, etc.

In an LTE/LTE-A system, a UE may obtain slot timing by detecting a primary synchronization signal (PSS), and obtain frame timing by detecting a secondary synchronization signal (SSS). Based on the slot timing and the frame timing, the UE may obtain synchronization with a base station. And furthermore, the UE needs to acquire system information (SI) of the network.

Figure 1:
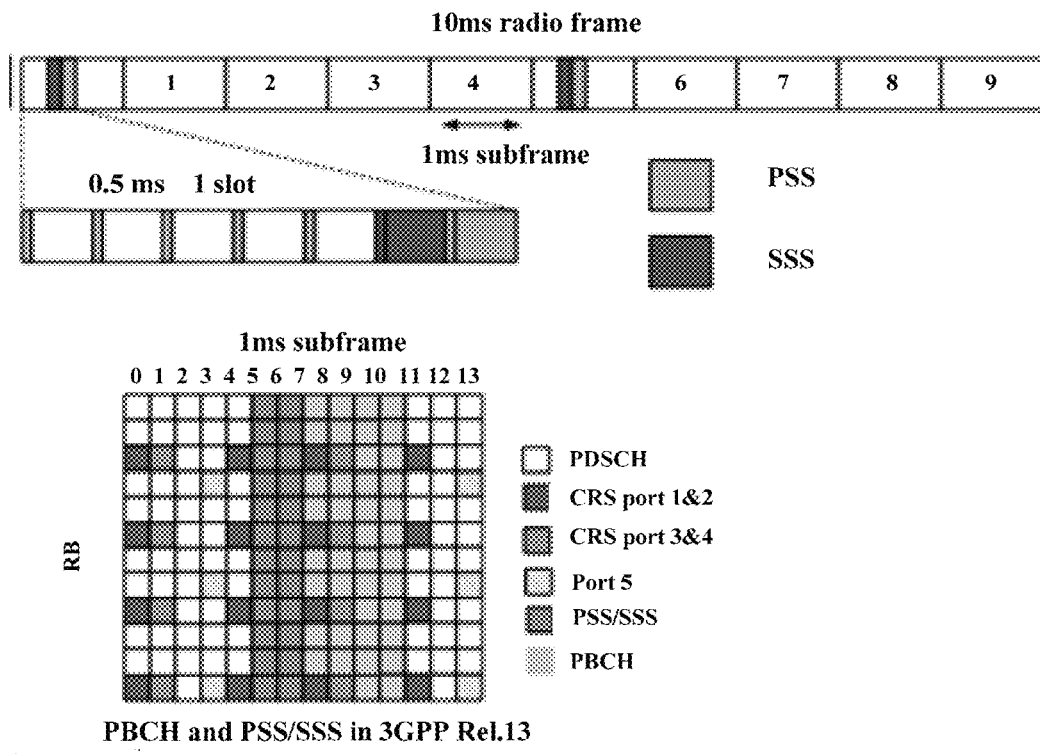
FIG. 1 is a schematic diagram of a structure of a frame in an LTE/LTE-A system.
Figure 2:
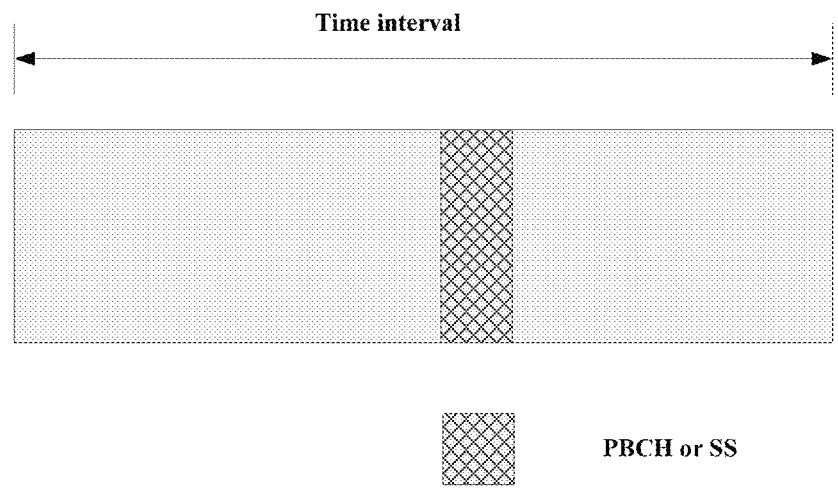
FIG. 2 is a schematic diagram of transmitting a PBCH or a synchronization signal in the LTE/LTE-A system.

FIG. 1 is a schematic diagram of a structure of a frame in an LTE/LTE-A system, and FIG. 2 is a schematic diagram of transmitting a PBCH or a synchronization signal in the LTE/LTE-A system. As shown in FIGS. 1 and 2, the PBCH and/or the synchronization signal (SS, including a PSS/SSS) are(is) transmitted only once.

What is most important in SI is mater information block (MIB) information, which contains parameter information necessary for initial access to the cell, such as a system bandwidth, a size of a physical hybrid automatic repeat request indicator channel (PHICH), and a system frame number (SFN), etc. And the MIB information is carried by a physical broadcast channel (PBCH).

Hence, the UE may obtain parameters necessary for demodulating a physical downlink control channel (PDCCH), then may obtain system information, such as SIB1, and SIB2, etc., and finally may perform uplink random access. During the series of procedures, the synchronization signal (including a PSS/SSS) and the PBCH are necessary signals for the initial access.

In a fifth generation (5G) system or a new radio (NR) system nominated according to the 3rd Generation Partnership Project (3GPP), bands higher than 6 GHz will be used as carrier bands, and there is a need to improve reliability and provide coverage ranges. And in this case, synchronization signals and PBCHs necessary for the initial access need to be newly designed.

For instance, for high-frequency wireless communication, such as communication of a centimeter wave or a millimeter wave, attenuation of radio waves is very severe, which will result in limitation on transmission distances of signals. Therefore, the multi-antenna technique will be adopted to increase coverage ranges of radio waves by means of the beamforming technique.

However, there exists a problem that a narrow beam means that the UE can receive signals of relatively good strength in a direction to which the beam directs, and quality of signals received by a UE out of a coverage range of the beam is very poor. For data transmission, by designing a scheduling algorithm and with reference to analog beamforming, or digital beamforming, or hybrid beamforming, a UE within a cell may be enabled to receive data information with guaranteed quality of service (QoS).

Difficulties exist in that for information that is received by all UEs within the cell, such as the cell signals mentioned above, if the isotropic antenna transmission mode is still used, a cell radius will be very small due to propagation features of the high-frequency waves. And in this case, the beamforming mode must be used for such type of signals, and usually the analog beamforming may be used. However, it is not limited thereto.

A subsequent problem is that in the beamforming, it may only be ensured that a UE within a certain angular range may receive wireless signals of sufficient strengths and recover transmission information. Use of beam sweeping is an effective method if other angles need to be covered. That is, transmission is performed for a plurality of times at a plurality of time instances or a plurality of time units at a time interval by using a plurality of beams in a time-division manner, so that main lobes of a plurality of time-division beams may cover an expected area (such as a sector, or a cell).

Figure 3:
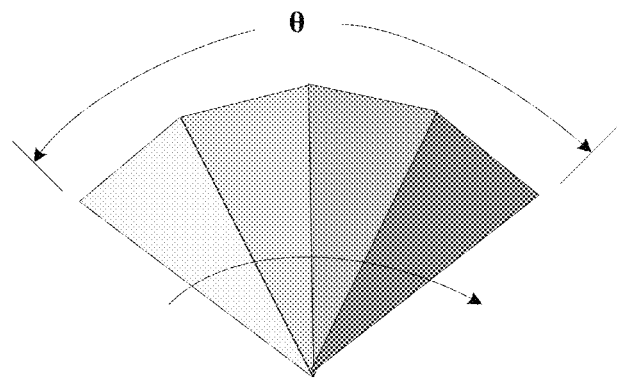
FIG. 3 is a schematic diagram of transmitting beams in a beamforming system.

FIG. 3 is a schematic diagram of transmitting beams in a beamforming system. As shown in FIG. 3, a transmitter covers a sector of a rotational angle θ by a plurality of time-division steps; beams are transmitted at a time instance or time unit to which each step in the sweeping corresponds, and the number of the steps may be fixed, or may be configurable, or may be flexibly variable. Seen from a format for transmitting signals, for example, the PSS in FIG. 1 occupies only one time unit (such as an orthogonal frequency-division multiplexing (OFDM) symbol), while in the beam sweeping procedure in FIG. 3, the PSS needs to occupy a plurality of time units (symbols), and so does the SSS.

Figure 4:
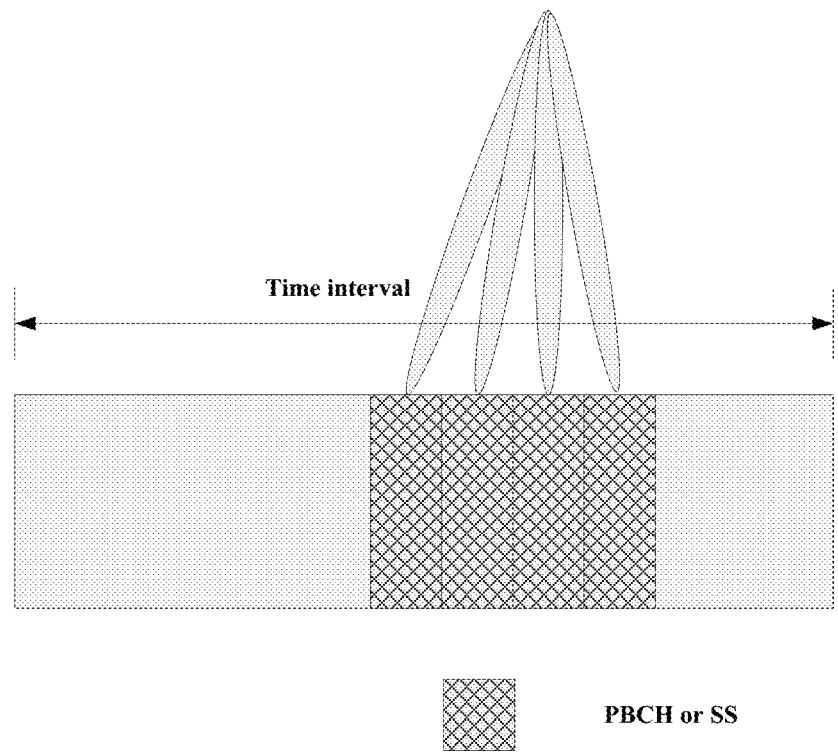
FIG. 4 is a schematic diagram of transmitting PBCHs or synchronization signals in the beamforming system.

FIG. 4 is a schematic diagram of transmitting PBCHs or synchronization signals in the beamforming system, in which only a case of transmitting a plurality of PBCHs or synchronization signals is schematically shown. As shown in FIG. 4, at a time interval (such as a subframe), the PBCHs and/or synchronization signals need to be transmitted multiple times. In the LTE/LTE-A system, a position of a frame header may be extrapolated by detecting positions of the PSSs and SSSs; however, when the beam sweeping manner is used, the UE is unable to estimate a beam, or a time unit in a plurality of time units, or a time instance in a plurality of time instances, to which a captured synchronization signal corresponds. Hence, it is unable to extrapolate a header position of a time interval (such as a frame or a subframe) and establish downlink synchronization.

Using a physical broadcast channel to carry timing information of a time interval in this disclosure shall be described below in detail.

In these embodiments, a transmitting device may a base station and a receiving device may be a UE. However, this disclosure is not limited thereto, and the transmitting device and/or the receiving device may also be other network device(s). This disclosure shall be schematically described below by taking a base station and a UE as an example.

It should be noted that a concept or content of a signal or channel in this disclosure may be similar to those in the LTE/LTE-A system. However, this disclosure is not limited thereto, it may be, for example, an enhanced signal or an enhance channel, or a newly defined signal or channel. For example, the synchronization signals and physical broadcast channels in this disclosure should not be simply deemed as being equivalent to the PSSs/SSSs and PBCHs in the LTE/LTE-A system, and should be understood in a broad sense.

Embodiment 1

Figure 5:
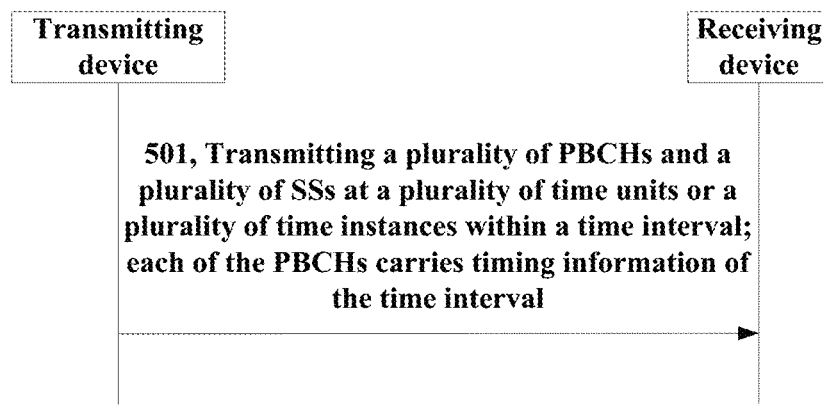
FIG. 5 is a schematic diagram of the information indication method of Embodiment 1 of this disclosure.

The embodiments of this disclosure provide an information indication method, applicable to a transmitting device (such as a base station). FIG. 5 is a schematic diagram of the information indication method of the embodiment of this disclosure. As shown in FIG. 5, the information indication method includes:

501: a transmitting device transmits a plurality of physical broadcast channels and a plurality of synchronization signals at a plurality of time units or a plurality of time instances within a time interval, and each of the physical broadcast channels carries timing information of the time interval.

In an embodiment, the plurality of physical broadcast channels and the corresponding synchronization signals may be transmitted by the transmitting device as formed beams. The formed beams are transmitted in identical or different directions in a time-division manner; for example, within the time interval, the formed beams are transmitted at fixed or configurable multiple time units or multiple time instances in identical or different directions in a time-division manner. However, this disclosure is not limited thereto; for example, this disclosure is also applicable to other scenarios than beamforming.

In an embodiment, each time interval may include a plurality of time units or a plurality of time instances, and all or part of the plurality of time units or the plurality of time instances may transmit physical broadcast channels and/or synchronization signals, that is, the time units or time instances may correspond to the physical broadcast channels and/or synchronization signals one to one, or not one to one.

For example, a time interval may include 10 time units, 5 of which may transmit physical broadcast channels and synchronization signals, respectively.

Furthermore, a physical broadcast channel and a synchronization signal may be transmitted at one time unit or time instance, or only a physical broadcast channel may be transmitted at one time unit or time instance, or only a synchronization signal may be transmitted at one time unit or time instance, that is, the physical broadcast channels may correspond to the synchronization signals one to one, or not one to one.

In an embodiment, the numbers of the plurality of physical broadcast channels and the plurality of synchronization signals transmitted at a time interval may be fixed; for example, a fixe value may be predefined (that is, it is statically kept constant). For example, N physical broadcast channels and M synchronization signals may be transmitted at a time interval; where, N and M may be identical value, or may be different values.

Taking a beam sweeping procedure as an example, for example, the numbers of the plurality of physical broadcast channels and the plurality of synchronization signals transmitted at a TTI may be fixed, which means that the number of steps (or the number of beams) in the beam sweeping procedure may be fixed. This may bring following advantages: for example, making times of the UE in initial cell search and neighboring cell search controllable, and making an implementation complexity of the cell search controllable. Moreover, in a mechanism in which physical broadcast channels are used to carry timing information of a time interval, such fixed values may make signaling overhead very few.

Furthermore, the numbers of the plurality of physical broadcast channels and the plurality of synchronization signals transmitted at a time interval may be configurable. For example, they may be set to be values that are kept constant within a certain period of time (that is, they may be semi-statically configured), or they may be set to be values that vary according to instructions (that is, they may be dynamically configured).

In an embodiment, a time instance may refer to a time point. As each signal has a transmission time length, a time instance may mark a corresponding starting time point of transmission when a signal is transmitted, and a duration of the transmission may be determined by a length of the signal. A relationship between the signals and time instances is schematically described above; however, this disclosure is not limited thereto, and reference may be made for particular contents.

In an embodiment, the time interval or the time unit may include any one of the following time resource units: a symbol, a subframe, a frame, a transmission time interval. However, this disclosure is not limited thereto. It should be noted that the time interval or the time unit in the embodiments of this disclosure may have a hierarchical relationship; for example, a certain time interval may include time intervals or time units of smaller granularities, and a certain time unit may also include time intervals or time units of smaller granularities.

Figure 6:
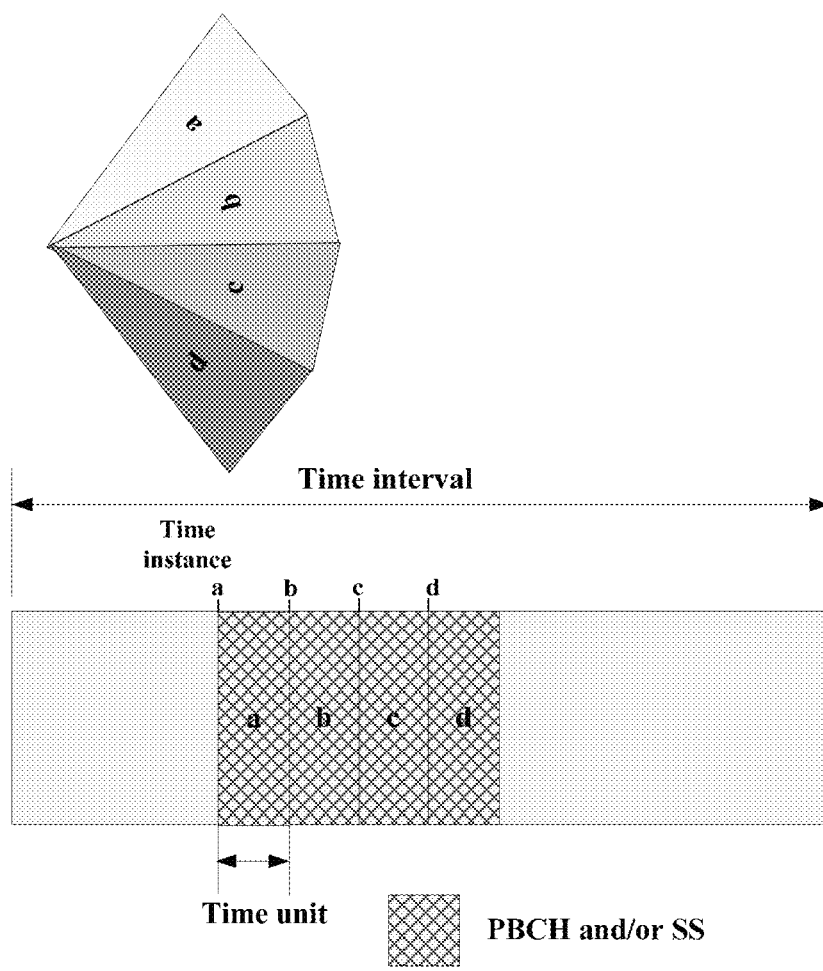
FIG. 6 is a schematic diagram of transmitting physical broadcast channels and/or synchronization signals in the embodiment of this disclosure.

FIG. 6 is a schematic diagram of transmitting physical broadcast channels and/or synchronization signals in an embodiment of this disclosure. As shown in FIG. 6, the time interval may be a subframe, and the time unit may be one or more symbols in the subframe. In other words, the signal is transmitted at a certain time instance. Each subframe may include a plurality of time units, and the beams vary sequentially between different time units, or, in other words, the signal is transmitted at a plurality of time instances (such as time instance a, time instance b, time instance c and time instance d shown in FIG. 6) by using a plurality of beams.

Figure 7:
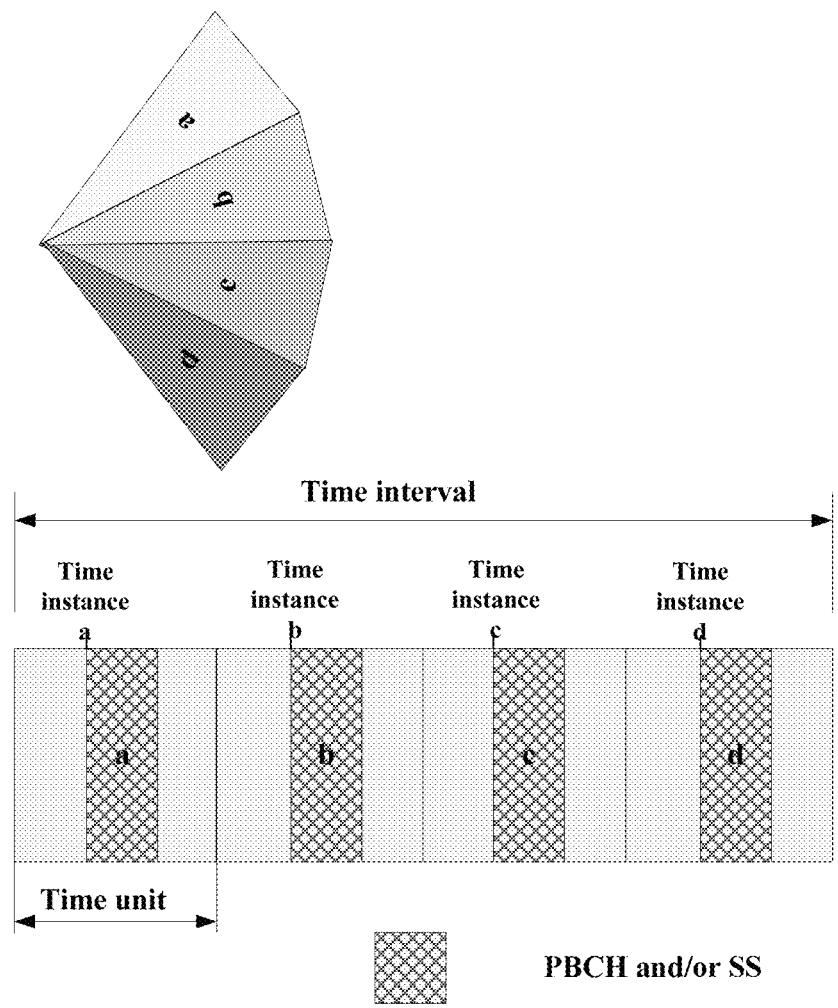
FIG. 7 is another schematic diagram of transmitting physical broadcast channels and/or synchronization signals in the embodiment of this disclosure.

FIG. 7 is another schematic diagram of transmitting physical broadcast channels and/or synchronization signals in the embodiment of this disclosure. As shown in FIG. 7, the time interval may be a frame, and the time unit may be subframes in the frame, each subframe containing a single physical broadcast channel and/or synchronization signal; and each frame may contain a plurality of subframes, and beams vary sequentially between different subframes. Likewise, it may be summarized that the signal is transmitted at a plurality of time instances (such as time instance a, time instance b, time instance c and time instance d shown in FIG. 7) by using a plurality of beams.

It should be noted that FIGS. 6 and 7 only schematically show transmitting physical broadcast channels and/or synchronization signals in the embodiment of this disclosure. However, this disclosure is not limited thereto. And the time interval and time units in the embodiment of this disclosure only characterize an affiliation defined for the convenience of explanation, and particular meanings of thereof are not limited in this disclosure, and may be determined according to an actual scenario.

In an embodiment, for a physical broadcast channel, the timing information of the time interval may include: information on a position of the time unit where the physical broadcast channel is located in the time interval; or information on a transmission time instance of the physical broadcast channel in the time interval; or information on a transmission order of the time unit where the physical broadcast channel is located in the time interval.

For example, for the physical broadcast channel transmitted on the third beams at time instance c in FIG. 6, the broadcast channel includes information on a transmission order corresponding to "3".

In an embodiment, each physical broadcast channel may correspond to a synchronization signal, there existing a predetermined temporal relationship between the physical broadcast channel and the corresponding synchronization signal. That is, a distance in the time domain between the synchronization signal and the physical broadcast channel is fixed. For example, similar to that in the LTE system, they are neighboring in the time domain. However, this disclosure is not limited thereto, and may also not neighboring.

In such a case, for a certain physical broadcast channel, the timing information of the time interval may further include: information on a position of the time unit where the synchronization signal to which the physical broadcast channel corresponds is located in the time interval; or information on transmission time instance of the synchronization signal to which the physical broadcast channel corresponds in the time interval; or information on a transmission order of the time unit where the synchronization signal to which the physical broadcast channel corresponds is located in the time interval.

Figure 8:
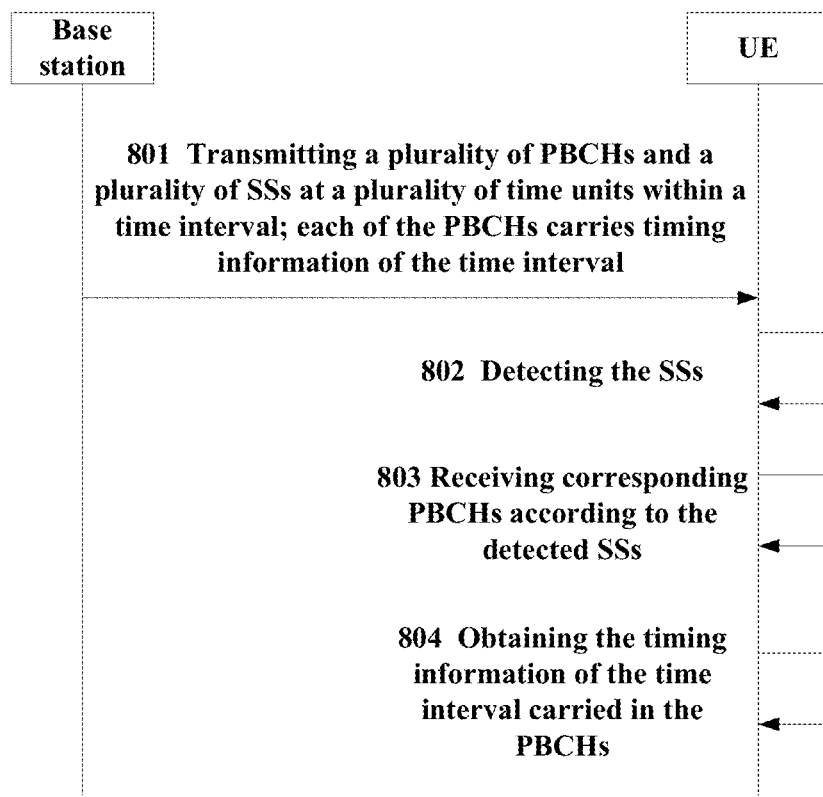
FIG. 8 is another schematic diagram of the information indication method of Embodiment 1 of this disclosure.

FIG. 8 is another schematic diagram of the information indication method of the embodiment of this disclosure, in which the whole procedure shall be described by taking a base station and a UE as an example. As shown in FIG. 8, the information indication method includes:

801: a base station transmits a plurality of physical broadcast channels and a plurality of synchronization signals to a UE at a plurality of time units within a time interval; each of the physical broadcast channels carries timing information of the time interval.

802: the UE detects the synchronization signals transmitted by the base station.

803: the UE receives corresponding physical broadcast channels according to the detected synchronization signals.

804: the UE obtains the timing information of the time interval carried in the physical broadcast channel.

It should be noted that FIG. 8 only schematically describes the embodiment of this disclosure. However, this disclosure is not limited thereto. For example, an order of execution of the steps may be appropriately adjusted; and furthermore, some other steps may be added, or some of these steps may be reduced. And appropriate modifications may be made by those skilled in the art according to what is described above, without being limited to those contained in above figures.

In an embodiment, the physical broadcast channels and the synchronization signals may have identical time intervals (such as an identical transmission time interval and/or transmission direction). For example, the physical broadcast channels and the synchronization signals may correspond to each other one to one.

Figure 9:
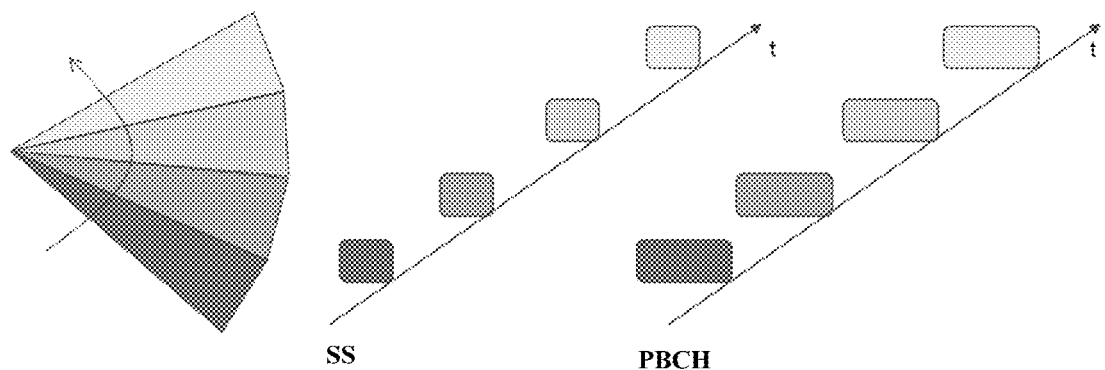
FIG. 9 is a schematic diagram of physical broadcast channels and synchronization signals having identical time intervals in Embodiment 1 of this disclosure.

FIG. 9 is a schematic diagram of a plurality of physical broadcast channels and a plurality of synchronization signals having identical time intervals in the embodiment of this disclosure. As shown in FIG. 9, the physical broadcast channels and synchronization signals may adopt an identical beam sweeping procedure, and perform sweeping at a time domain interval and a spatial domain interval in the identical beam sweeping. And optionally, a physical broadcast channel to which each beam corresponds may be decoded on one's own. However, this disclosure is not limited thereto.

Figure 10:
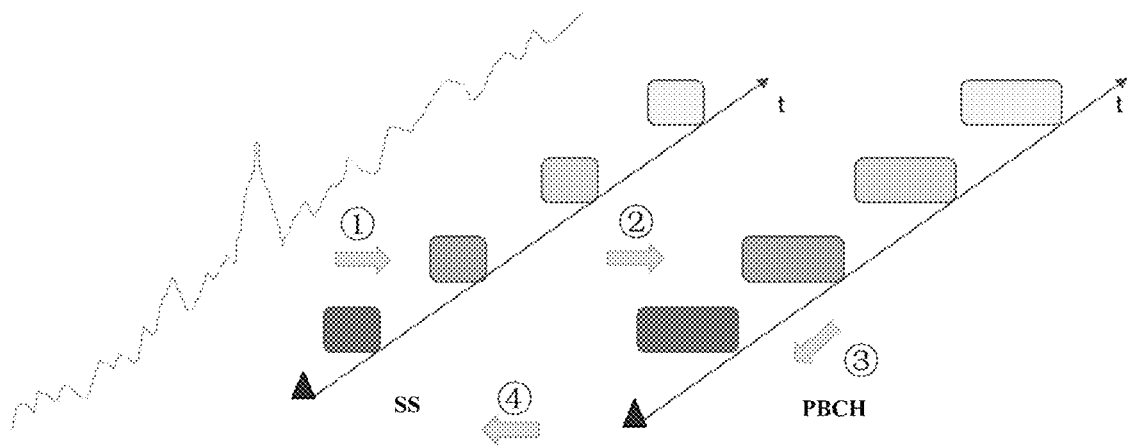
FIG. 10 is a schematic diagram of using a predetermined temporal relationship in Embodiment 1 of this disclosure.

FIG. 10 is a schematic diagram of using a predetermined temporal relationship in the embodiment of this disclosure, in which it is shown that the UE obtains the timing information of the time interval as a receiving device by synchronization detection. As shown in FIG. 10, after a detection operation (such as a coherent detection operation) of synchronization signals, a strongest synchronization signal may be positioned by a highest correlation value, as shown in ① in FIG. 10.

As there exists the predetermined temporal relationship between the physical broadcast channel and the corresponding synchronization signal, a position of a corresponding physical broadcast channel may be extrapolated from the position of the synchronization signal, as shown in ② in FIG. 10, so as to recover the timing information of the time interval carried by the physical broadcast channel. A carrying manner may be explicit, or may be implicit, as described later. And furthermore, a manner to which the beam sweeping here corresponds may be either multi-beam continuous variation taking a duration of the physical broadcast channels and/or synchronization signals within the time interval (such as a subframe) shown in FIG. 6 as a unit, or multi-beam continuous variation taking a subframe as a unit within the time interval (such as a frame) shown in FIG. 7.

After obtaining the timing information of the time interval, the information on the position of the time unit where the physical broadcast channel is located within the time interval or the information on the time instance when the physical broadcast channel is transmitted may be extrapolated, as shown in ③ in FIG. 10. Then information on an starting position of the time unit where the synchronization signal is located relative to the time interval, or information on a time instance when the synchronization signal is transmitted, may be obtained, as shown in ④ in FIG. 10. Hence, the UE and the base station may be synchronized.

In an embodiment, the synchronization signal may employ a two-stage synchronization signal structure like the PSS/SSS in the LTE system, or may employ other new synchronization signal structures, such as a one-stage synchronization signal structure. Likewise, a synchronization sequence used may be a sequence in consistence with that in the LTE system, or may be a new synchronization signal sequence.

For example, like the case in the LTE system, the synchronization signal may occupy sixe resource blocks (RBs) near a center of a carrier, or may be at other positions of the carrier. However, this disclosure is not limited thereto, and a particular synchronization signal structure may be determined according to an actual situation.

Likewise, the physical broadcast channel may follow a basic structure of a PBCH in the LTE system, or may adopt a new structure, including adopting different coding modulation schemes, occupied symbol lengths, and bandwidths, etc. And a relationship between a time-frequency position where the physical broadcast channel is located and a position of the synchronization signal may be predefined.

In an embodiment, the plurality of physical broadcast channels and the plurality of synchronization signals may have different time intervals (such as different transmission time intervals and/or transmission directions).

Figure 11:
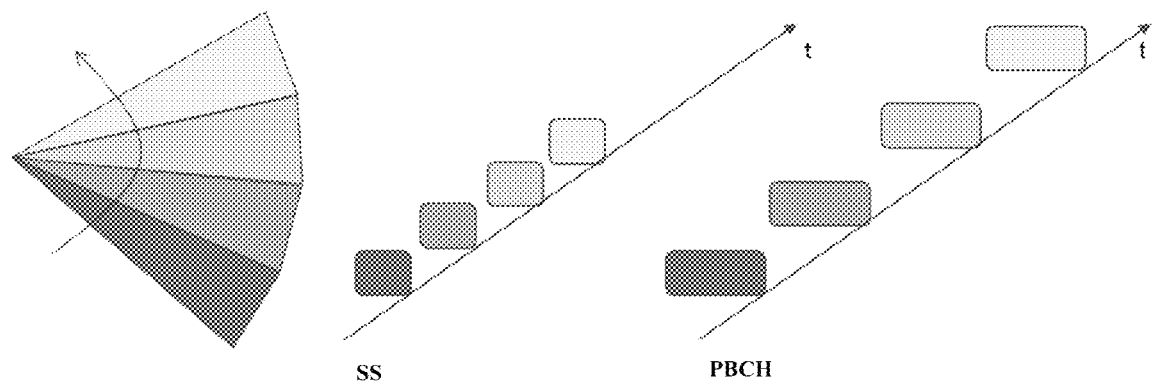
FIG. 11 is a schematic diagram of a plurality of physical broadcast channels and a plurality of synchronization signals having different time intervals in Embodiment 1 of this disclosure.

FIG. 11 is a schematic diagram of a plurality of physical broadcast channels and a plurality of synchronization signals having different time intervals in the embodiment of this disclosure. As shown in FIG. 11, the beam sweeping time intervals used by the physical broadcast channels and synchronization signals are different. However, only if related information is predefined, the UE as the receiving device may search positions of corresponding physical broadcast channels in a blind detection manner.

How the timing information of the time interval is carried by the physical broadcast channel shall be described below.

In an embodiment, the timing information of the time interval may be explicitly indicated by adding one or more bits to the physical broadcast channel. For example, information indicating a position of the time unit where the physical broadcast channel is located within a last stage of time interval may be added to an MIB message.

Figure 12:
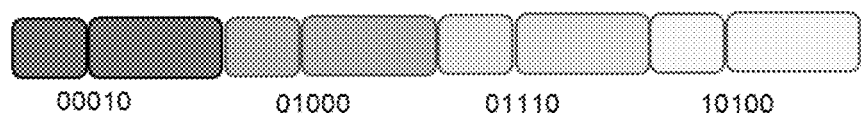
FIG. 12 is a schematic diagram of the timing information of the time interval that is explicitly carried in Embodiment 1 of this disclosure.

FIG. 12 is a schematic diagram of the timing information of the time interval in an embodiment of this disclosure that is explicitly carried. As shown in FIG. 12, information on a position of a starting symbol (a time unit) occupied by the physical broadcast channel relative to a header of the last stage of time interval (such as a subframe) may be added to the MIB message.

For example, as to the schematic diagram of FIG. 10, there are four physical broadcast channels and synchronization signals within a time interval (such as a subframe). Assuming that one subframe includes 24 symbols, each physical broadcast channel includes 4 symbols, and there exists a physical broadcast channel every 6 symbols. Each physical broadcast channel is transmitted from a third symbol in the 6 symbols, the former two symbols are synchronization signals, and then 5 bits may be added to the MIB information to denote the information on position.

Referring to the example shown in FIG. 10, for the second physical broadcast channel, corresponding MIB information is '01000', denoting being spaced apart from the starting position of the time interval by 8 symbols. Such a method in this example may be applied to the beam sweeping when the number of the beams is not fixed. When a length of a symbol is defined, this method may also express a starting time instance of a beam to which the symbol corresponds, likewise, this method may also be used to indicate positions of synchronization signals.

If the number of the beams in the beam sweeping is fixed, that is, the numbers of the physical broadcast channels and synchronization signals transmitted within a time interval equivalently are fixed, information indicating which time the physical broadcast channels and synchronization signals are transmitted within a time interval may be attached to the MIB information.

Figure 13:
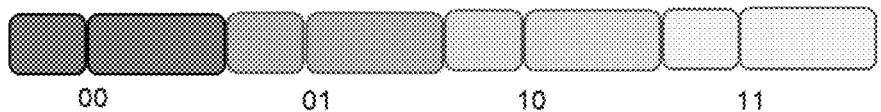
FIG. 13 is another schematic diagram of the timing information of the time interval that is explicitly carried in Embodiment 1 of this disclosure.

FIG. 13 is another schematic diagram of the timing information of the time interval that is explicitly carried in the embodiment of this disclosure. As shown in FIG. 13, as to the schematic diagram of FIG. 10, there are four physical broadcast channels and synchronization signals within a time interval (such as a subframe), and then introduction of 2 bits may denote positions of the physical broadcast channels and/or synchronization signals, i.e. information on a transmission order. Referring to the example shown in FIG. 10, for the second physical broadcast channel and/or synchronization signal, corresponding MIB information is '01'. Hence, overhead of attachment of signaling is very few, and time and complexity needed in the cell search by the UE are relatively controllable.

FIGS. 12 and 13 may also correspond to the embodiment in FIG. 6 or 7. As for FIG. 6, within a time interval (such as a subframe), a plurality of beams vary continuously at a plurality of time units, an interval of variation of the beams here being a duration of the physical broadcast channels and/or synchronization signals. And as for FIG. 7, within a time interval (such as a frame), a plurality of beams vary continuously at a plurality of time units (such as subframes), an interval of variation of the beams here being subframes, and directions of the beams within the subframes being fixed.

For example, for the example shown in FIG. 7, MIB information may be employed for indication. And within a subframe, only a single physical broadcast channel and/or a single synchronization signal is (are) contained, a distance between which and the subframe header is predefined. In this way, if the number of the beams in the beam sweeping is not fixed, assuming there are 10 subframes in a frame, 4 bits in the MIB may be used to indicate positions of subframes to which the beams correspond. And if the number of the beams in the beam sweeping is fixed, the above indication manner of transmission order may still be used. For example, corresponding to 4 beams, introduction of 2 bits may denote information on a transmission order of the physical broadcast channels and/or synchronization signals. And for the second beam (or the physical broadcast channels and/or synchronization signals to which it corresponds), corresponding MIB information is '01'.

In an embodiment, the timing information of the time interval may be implicitly indicated by coding or modulation information of the physical broadcast channel. The coding or modulation information may be, for example, a scrambling sequence for modulating the physical broadcast channel, or a cyclic redundancy check (CRC) code, etc. However, this disclosure is not limited thereto.

For example, it may be carried on the physical broadcast channel by using different scrambling sequences and/or adopting different CRC masks in a coding or modulation process. Such a manner of carrying information is similar to the manner of carrying two bits of information of a lowest order of an SFN by a PBCH and carrying antenna port information in the LTE system, and a receiver needs to perform detection by means of blind detection, with details being not going to be described herein any further.

In the above embodiments, the physical broadcast channel in each beam sweeping step may be decoded on its own, and carries information on timing of the time interval. For example, it may indicate a position of the time unit where it is located within its higher stage of time interval.

The time unit here where the physical broadcast channel is located may correspond to a starting symbol position of the physical broadcast channel, and its last stage of time interval may be a time-domain resource unit having a stage of subframe or a TTI higher than that of a symbol. Or, the time unit here where the physical broadcast channel is located may be a position of a subframe or a TTI where the physical broadcast channel is located, and its last stage of time interval may be a time-domain resource unit having a stage of frame higher than that of a subframe or a TTI. When a length of a symbol is fixed, this method may also indicate a starting time instance of the beam to which the symbol corresponds.

In an embodiment, the position may correspond to an absolute time position of the starting symbol of the physical broadcast channel in the last time interval (such as a subframe or a TTI), or correspond to a relative time distance between the starting symbol of the physical broadcast channel and a starting position of the last time interval, or correspond to a transmission instance message of the physical broadcast channel within the time interval.

Furthermore, the position may correspond to an absolute time position of the subframe or TTI where the physical broadcast channel is located in the last time interval (such as a frame), or correspond to a relative time distance between the subframe or TTI where the physical broadcast channel is located and the starting position (such as a frame header) of the last time interval (such as a frame).

Moreover, the timing information carried by the physical broadcast channel may indicate which time of transmission within a time interval to which the physical broadcast channel corresponds. For example, it may indicate a time when the physical broadcast channel is transmitted within such a time interval as a subframe, or a TTI, etc., and may indicate a time when such time interval as the subframe or TTI where the physical broadcast channel is located is transmitted within the last time interval (such as a frame).

It can be seen from the above embodiments that a plurality of physical broadcast channels and a plurality of synchronization signals are transmitted at a plurality of time units or a plurality of time instances within a time interval, and each of the physical broadcast channels carries timing information of the time interval. Hence, even a plurality of physical broadcast channels and a plurality of synchronization signals are transmitted at a plurality of time units or a plurality of time instances within a time interval, the timing information of the time interval may be obtained with a simple structure and operation.

Embodiment 2

The timing information of the time interval shall be further described in these embodiments on the basis of Embodiment 1, with contents identical to those in the Embodiment 1 being not going to be described herein any further.

In an embodiment, the timing information of the time interval may include: timing information of the physical broadcast channels in the time interval, and/or timing information of the synchronization signals in the time interval. However, this disclosure is not limited thereto. For example, time information on a starting position of the time interval may be directly contained in the physical broadcast channels.

The timing information of the time interval shall be described below in detail.

In an embodiment, the timing information of the time interval may be information related to the physical broadcast channels.

For example, in Embodiment 1, for a certain physical broadcast channel, the timing information of the time interval may include: information on a position of the time unit where the physical broadcast channel is located in the time interval, or information on a transmission time instance of the physical broadcast channel in the time interval, or information on a transmission order of the time unit where the physical broadcast channel is located in the time interval.

In an embodiment, for a physical broadcast channel, the timing information of the time interval may also be: information on a relative time of the time unit where the physical broadcast channel is located or the transmission time instance of the physical broadcast channel relative to a starting position of the time interval.

In an embodiment, the timing information of the time interval may the information related to the synchronization signals, that is, as there exists a fixed temporal relationship between the physical broadcast channel and the synchronization signal, the physical broadcast channel may directly carry the timing information of the synchronization signal.

For example, for a physical broadcast channel, the timing information of the time interval may be: information on a position of the time unit where the synchronization signal to which the physical broadcast channel corresponds is located in the time interval, or information on transmission time instance of the synchronization signal to which the physical broadcast channel corresponds in the time interval, or information on a transmission order of the time unit where the synchronization signal to which the physical broadcast channel corresponds is located in the time interval.

Or, the timing information of the time interval may also be: information on a relative time of the time unit where the synchronization signal to which the physical broadcast channel corresponds is located or the transmission time instance of the synchronization signal relative to a starting position of the time interval.

In an embodiment, the timing information of the synchronization signal may be explicitly or implicitly carried on the physical broadcast channel. And the timing information of the time interval may be explicitly indicated by adding one or more bits to the physical broadcast channel. For example, bits are added to the MIB message to indicate information on a position of a time unit where the synchronization signal is located within a last stage of time interval, or bits are added to indicate information on a position of a time instance of the synchronization signal within the last stage of time interval.

Alternatively, the timing information of the time interval is implicitly indicated by coding or modulation information of the physical broadcast channel. For example, information on a position of a time unit where the synchronization signal is located within a last stage of time interval is implicitly indicated by CRC of the physical broadcast channel, or bits are added to indicate information on a position of a time instance of the synchronization signal within the last stage of time interval.

Embodiment 3

The embodiments of this disclosure provide an information indication method, which shall be described from a receiving device (such as a UE), with contents identical to those in Embodiments 1 and 2 being not going to be described herein any further.

Figure 14:
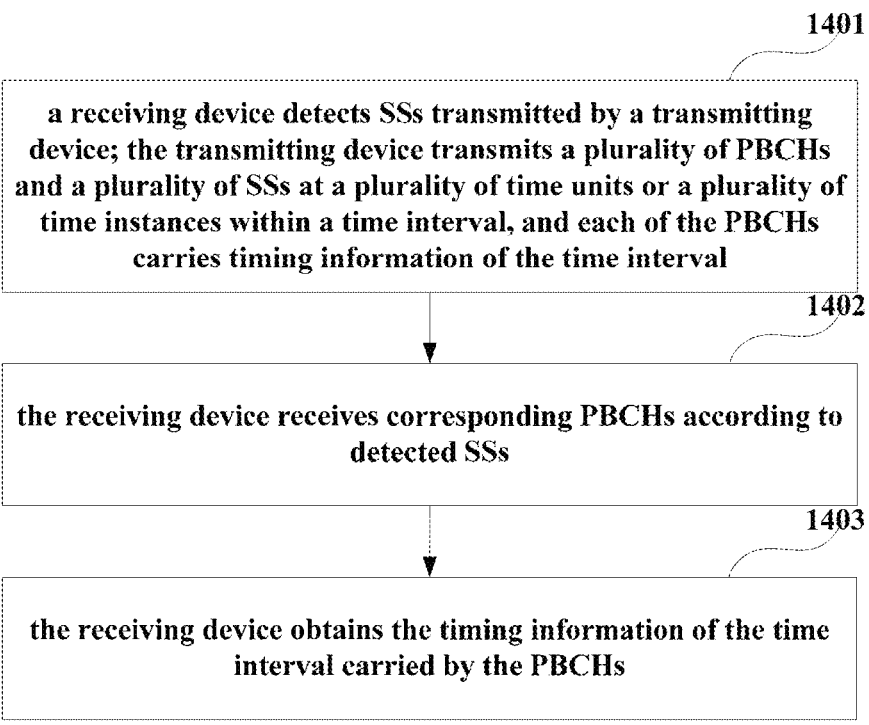
FIG. 14 is a schematic diagram of the information indication method of Embodiment 3 of this disclosure.

FIG. 14 is a schematic diagram of the information indication method of the embodiment of this disclosure. As shown in FIG. 14, the information indication method includes:

Block 1401: a receiving device detects synchronization signals transmitted by a transmitting device; the transmitting device transmits a plurality of physical broadcast channels and a plurality of synchronization signals at a plurality of time units or a plurality of time instances within a time interval, and each of the physical broadcast channels carries timing information of the time interval.

Block 1402: the receiving device receives corresponding physical broadcast channels according to detected synchronization signals.

Block 1403: the receiving device obtains the timing information of the time interval carried by the physical broadcast channel.

In an embodiment, the numbers of the plurality of physical broadcast channels and the plurality of synchronization signals transmitted at a time interval may be fixed, or may be configurable.

In an embodiment, the timing information of the time interval may include: timing information of the physical broadcast channels in the time interval, and/or timing information of the synchronization signals in the time interval. However, this disclosure is not limited thereto, and it may also be other information indicating the timing of the time interval.

In an embodiment, for a certain physical broadcast channel, the timing information of the time interval may include: information on a position of the time unit where the physical broadcast channel is located in the time interval, or information on a transmission order of the time unit where the physical broadcast channel is located in the time interval, or information on transmission time instance of the physical broadcast channel in the time interval, or information on a relative time of the time unit where the physical broadcast channel is located or the transmission time instance of the physical broadcast channel relative to a starting position of the time interval.

In an embodiment, each of the physical broadcast channels may correspond to one of the synchronization signals, and there exists a predetermined temporal relationship between the physical broadcast channel and the corresponding synchronization signal. And the physical broadcast channels and the synchronization signals may have identical transmission intervals, or may have different transmission intervals. However, this disclosure is not limited thereto.

In an embodiment, for a certain physical broadcast channel, the timing information of the time interval may further include: information on a position of the time unit where the synchronization signal to which the physical broadcast channel corresponds is located in the time interval, or information on a transmission order of the time unit where the synchronization signal to which the physical broadcast channel corresponds is located in the time interval, or information on transmission time instance of the synchronization signal to which the physical broadcast channel corresponds in the time interval, or information on a relative time of the time unit where the synchronization signal to which the physical broadcast channel corresponds is located or the transmission time instance of the synchronization signal relative to a starting position of the time interval.

In an embodiment, each time interval may include a plurality of time units or time instances; and the time interval or the time unit may be any one of the following time resource units: a symbol, a subframe, a frame, and a transmission time interval. However, this disclosure is not limited thereto.

In an embodiment, the timing information of the time interval may be explicitly indicated by adding one or more bits in the physical broadcast channel.

In an embodiment, the timing information of the time interval may be implicitly indicated by coding or modulation information of the physical broadcast channel.

In an embodiment, the physical broadcast channel and the corresponding synchronization signal are transmitted as formed beams by the transmitting device. The formed beams in the time interval are transmitted in identical or different directions by means of time division. For example, in the time interval, the formed beams are transmitted at a plurality of fixed or configurable time units or time instances in identical or different directions by means of time division.

It can be seen from the above embodiment that a plurality of physical broadcast channels and a plurality of synchronization signals are transmitted at a plurality of time units or a plurality of time instances within a time interval, and each of the physical broadcast channels carries timing information of the time interval. Hence, even a plurality of physical broadcast channels and a plurality of synchronization signals are transmitted at a plurality of time units or a plurality of time instances within a time interval, the timing information of the time interval may be obtained with a simple structure and operation.

Embodiment 4

The embodiments of this disclosure provide an information indication apparatus, configured in a transmitting device (such as a base station). The embodiments of this disclosure correspond to the information indication method in Embodiment 1, with identical contents being not going to be described herein any further.

Figure 15:
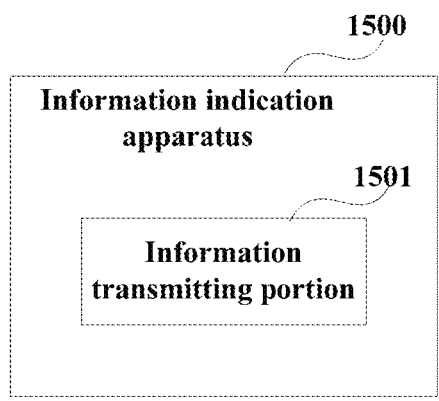
FIG. 15 is a schematic diagram of the information indication apparatus of Embodiment 4 of this disclosure.

FIG. 15 is a schematic diagram of the information indication apparatus of the embodiment of this disclosure. As shown in FIG. 15, the information indication apparatus 1500 includes:

an information transmitting portion 1501 configured to transmit a plurality of physical broadcast channels and a plurality of synchronization signals at a plurality of time units or a plurality of time instances within a time interval. Each of the physical broadcast channels carries timing information of the time interval.

In an embodiment, the numbers of the plurality of physical broadcast channels and the plurality of synchronization signals transmitted at a time interval are fixed, or are configurable.

In an embodiment, the timing information of the time interval may include: timing information of the physical broadcast channels in the time interval, and/or, timing information of the synchronization signals in the time interval. However, this disclosure is not limited thereto, and it may also be other information indicating the timing of the time interval.

In an embodiment, for a certain physical broadcast channel, the timing information of the time interval may include: information on a position of the time unit where the physical broadcast channel is located in the time interval, or information on a transmission order of the time unit where the physical broadcast channel is located in the time interval, or information on a transmission time instance of the physical broadcast channel in the time interval, or information on a relative time of the time unit where the physical broadcast channel is located or the transmission time instance of the physical broadcast channel relative to a starting position of the time interval.

In an embodiment, each of the physical broadcast channels may correspond to one of the synchronization signals, there existing a predetermined temporal relationship between the physical broadcast channel and the corresponding synchronization signal. And the physical broadcast channels and the synchronization signals may have identical transmission intervals, or may have different transmission intervals. However, this disclosure is not limited thereto.

In an embodiment, for a physical broadcast channel, the timing information of the time interval may further include: information on a position of the time unit where the synchronization signal to which the physical broadcast channel corresponds is located in the time interval, or information on a transmission order of the time unit where the synchronization signal to which the physical broadcast channel corresponds is located in the time interval, or information on transmission time instance of the synchronization signal to which the physical broadcast channel corresponds in the time interval, or information on a relative time of the time unit where the synchronization signal to which the physical broadcast channel corresponds is located or the transmission time instance of the synchronization signal relative to a starting position of the time interval.

In an embodiment, each time interval may include a plurality of time units or time instances; and the time interval or the time unit may be any one of the following time resource units: a symbol, a subframe, a frame, and a transmission time interval.

In an embodiment, the timing information of the time interval may be explicitly indicated by adding one or more bits to the physical broadcast channel.

In an embodiment, the timing information of the time interval may be implicitly indicated by coding or modulation information of the physical broadcast channel.

In an embodiment, the physical broadcast channel and the corresponding synchronization signal may be transmitted as formed beams by the transmitting device; the formed beams may be transmitted in identical or different directions by means of time division. For example, in the time interval, the formed beams are transmitted at a plurality of fixed or configurable time units or time instances in identical or different directions by means of time division.

It can be seen from the above embodiment that a plurality of physical broadcast channels and a plurality of synchronization signals are transmitted at a plurality of time units or a plurality of time instances within a time interval, and each of the physical broadcast channels carries timing information of the time interval. Hence, even a plurality of physical broadcast channels and a plurality of synchronization signals are transmitted at a plurality of time units or a plurality of time instances within a time interval, the timing information of the time interval may be obtained with a simple structure and operation.

Embodiment 5

The embodiments of this disclosure provide an information indication apparatus, configured in a receiving device (such as a UE). The embodiments of this disclosure correspond to the information indication method in Embodiment 2, with identical contents being not going to be described herein any further.

Figure 16:
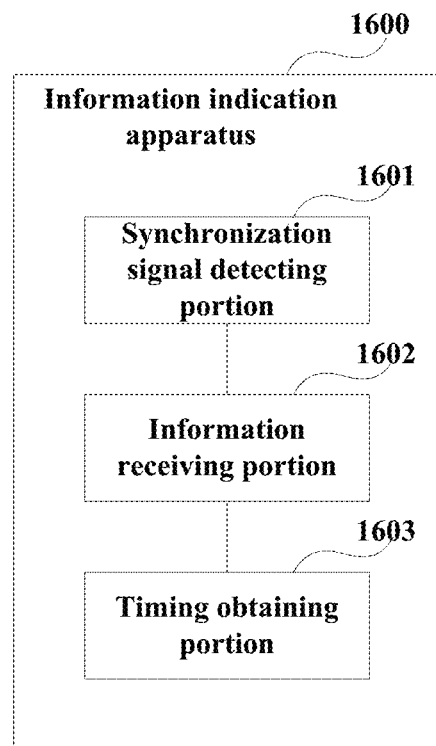
FIG. 16 is a schematic diagram of the information indication apparatus of Embodiment 5 of this disclosure.

FIG. 16 is a schematic diagram of the information indication apparatus of the embodiment of this disclosure. As shown in FIG. 16, the information indication apparatus 1600 includes:

a synchronization signal detecting portion 1601 configured to detect synchronization signals transmitted by a transmitting device; wherein, the transmitting device transmits a plurality of physical broadcast channels and a plurality of synchronization signals at a plurality of time units or a plurality of time instances within a time interval, and each of the physical broadcast channels carries timing information of the time interval;

an information receiving portion 1602 configured to receive corresponding physical broadcast channels according to detected synchronization signals; and a timing obtaining portion 1603 configured to obtain the timing information of the time interval carried by the physical broadcast channel.

In an embodiment, the numbers of the plurality of physical broadcast channels and the plurality of synchronization signals transmitted at a time interval are fixed, or are configurable.

In an embodiment, the timing information of the time interval may include: timing information of the physical broadcast channels in the time interval, and/or timing information of the synchronization signals in the time interval. However, this disclosure is not limited thereto, and it may also be other information indicating the timing of the time interval.

In an embodiment, for a certain physical broadcast channel, the timing information of the time interval may include: information on a position of the time unit where the physical broadcast channel is located in the time interval, or information on a transmission order of the time unit where the physical broadcast channel is located in the time interval, or information on transmission time instance of the physical broadcast channel in the time interval, or information on a relative time of the time unit where the physical broadcast channel is located or the transmission time instance of the physical broadcast channel relative to a starting position of the time interval.

In an embodiment, each of the physical broadcast channels may correspond to one of the synchronization signals, there existing a predetermined temporal relationship between the physical broadcast channel and the corresponding synchronization signal. And the physical broadcast channels and the synchronization signals may have identical transmission intervals, or may have different transmission intervals; however, this disclosure is not limited thereto.

In an embodiment, for a physical broadcast channel, the timing information of the time interval may further include: information on a position of the time unit where the synchronization signal to which the physical broadcast channel corresponds is located in the time interval, or information on a transmission order of the time unit where the synchronization signal to which the physical broadcast channel corresponds is located in the time interval, or information on transmission time instance of the synchronization signal to which the physical broadcast channel corresponds in the time interval, or information on a relative time of the time unit where the synchronization signal to which the physical broadcast channel corresponds is located or the transmission time instance of the synchronization signal relative to a starting position of the time interval.

In an embodiment, each time interval may include the time units or time instances; and the time interval or the time unit may be any one of the following time resource units: a symbol, a subframe, a frame, and a transmission time interval. However, this disclosure is not limited thereto.

In an embodiment, the timing information of the time interval may be explicitly indicated by adding one or more bits in the physical broadcast channel.

In an embodiment, the timing information of the time interval may be implicitly indicated by coding or modulation information of the physical broadcast channel.

In an embodiment, the physical broadcast channel and the corresponding synchronization signal may be transmitted as formed beams by the transmitting device; the formed beams may be transmitted in identical or different directions by means of time division. For example, in the time interval, the formed beams are transmitted at a plurality of fixed or configurable time units or time instances in identical or different directions by means of time division.

It can be seen from the above embodiment that a plurality of physical broadcast channels and a plurality of synchronization signals are transmitted at a plurality of time units or a plurality of time instances within a time interval, and each of the physical broadcast channels carries timing information of the time interval. Hence, even a plurality of physical broadcast channels and a plurality of synchronization signals are transmitted at a plurality of time units or a plurality of time instances within a time interval, the timing information of the time interval may be obtained with a simple structure and operation.

Embodiment 6

The embodiments of this disclosure provide a communication system, with contents identical to Embodiments 1-5 being not going to be described herein any further. The communication system may include:

a transmitting device configured to transmit a plurality of physical broadcast channels and a plurality of synchronization signals at a plurality of time units or a plurality of time instances within a time interval; wherein, each of the physical broadcast channels carries timing information of the time interval; and a receiving device configured to detect the synchronization signals transmitted by the transmitter end, receive corresponding physical broadcast channels according to detected synchronization signals, and obtain the timing information of the time interval carried by the physical broadcast channel.

In an embodiment, the transmitting device may be a base station and the receiving device may be a UE. However, this embodiment is not limited thereto.

Figure 17:
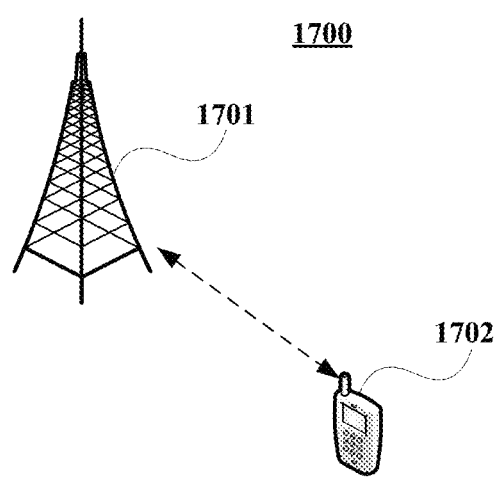
FIG. 17 is a schematic diagram of the communication system of Embodiment 6 of this disclosure.

FIG. 17 is a schematic diagram of the communication system of the embodiment of this disclosure, in which a case where the transmitting device is a base station and the receiving device is a UE is shown. As shown in FIG. 17, the communication system 1700 may include a base station 1701 and a UE 1702. The base station 1701 may be configured with the information indication apparatus 1500 described in Embodiment 3, and the UE 1702 may be configured with the information indication apparatus 1600 described in Embodiment 4.

The embodiments of this disclosure further provide a transmitting device, such as a base station However, this disclosure is not limited thereto, and it may also be other network devices. Following description shall be given by taking a base station as an example.

Figure 18:
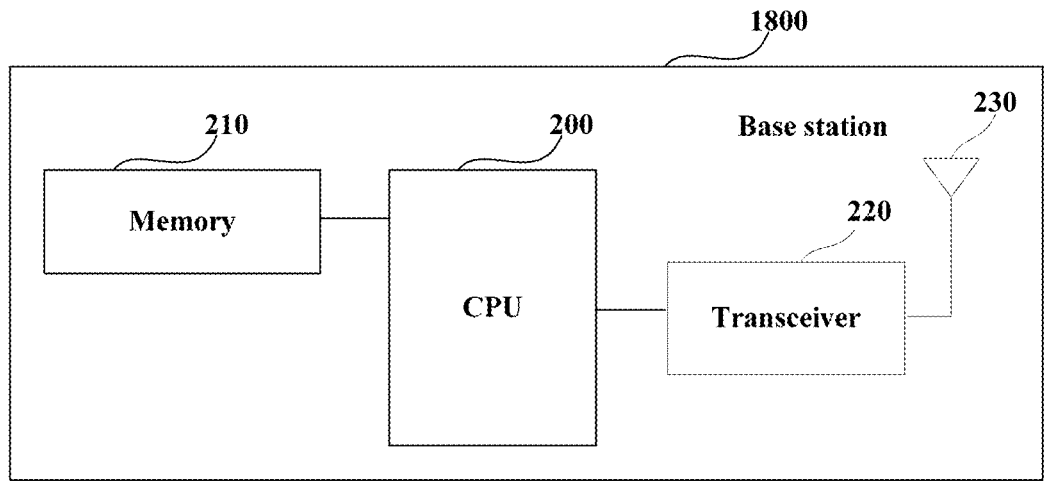
FIG. 18 is a schematic diagram of the base station of Embodiment 6 of this disclosure.

FIG. 18 is a schematic diagram of a structure of the base station of the embodiment of this disclosure. As shown in FIG. 18, the base station 1800 may include a central processing unit (CPU) 200 and a memory 210, the memory 210 being coupled to the central processing unit 200. The memory 210 may store various data, and furthermore, it may store a program for information processing, and execute the program under control of the central processing unit 200. And the central processing unit 200 may be configured to carry out the information indication method described in Embodiment 1.

For example, the central processing unit 200 may be configured to perform following control: transmit a plurality of physical broadcast channels and a plurality of synchronization signals at a plurality of time units or a plurality of time instances within a time interval; each of the physical broadcast channels carries timing information of the time interval.

Furthermore, as shown in FIG. 18, the base station 1800 may include a transceiver 220, and an antenna 230, etc. Functions of the above components are similar to those in the relevant art, and shall not be described herein any further. It should be noted that the base station 1800 does not necessarily include all the parts shown in FIG. 18, and furthermore, the base station 1800 may include parts not shown in FIG. 18, and the relevant art may be referred to.

The embodiments of this disclosure further provide a receiving device, such as a UE; however, this disclosure is not limited thereto, and it may also be other network devices. Following description shall be given by taking a UE as an example.

Figure 19:
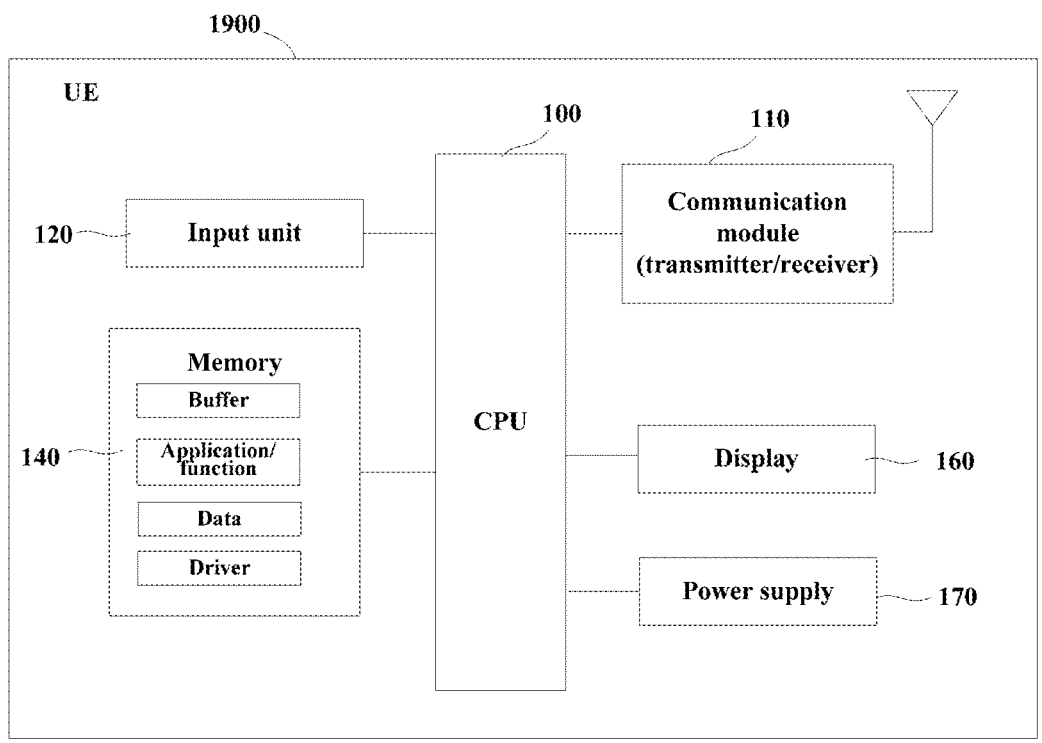
FIG. 19 is a schematic diagram of the user equipment of Embodiment 6 of this disclosure.

FIG. 19 is a schematic diagram of the UE of the embodiment of this disclosure. As shown in FIG. 19, the UE 1900 may include a central processing unit 100 and a memory 140, the memory 140 being coupled to the central processing unit 100. It should be noted that this figure is illustrative only, and other types of structures may also be used, so as to supplement or replace this structure and achieve a telecommunications function or other functions. The central processing unit 100 may be configured to carry out the information indication method described in Embodiment 2.

For example, the central processing unit 100 may be configured to perform following control: detect synchronization signals transmitted by a transmitting device; receive corresponding physical broadcast channels according to detected synchronization signals; and obtain the timing information of the time interval carried by the physical broadcast channel.

As shown in FIG. 19, the UE 1900 may further include a communication module 110, an input unit 120, a display 160 and a power supply 170. Functions of the above components are similar to those in the relevant art, and shall not be described herein any further. It should be noted that the UE 1900 does not necessarily include all the parts shown in FIG. 19, and the above components are not necessary; and furthermore, the UE 1900 may include parts not shown in FIG. 19, and the relevant art may be referred to.

An embodiment of the present disclosure provides a computer readable program code, which, when executed in an information indication apparatus or a transmitting device, will cause the information indication apparatus or the transmitting device to carry out the information indication method as described in Embodiment 1.

An embodiment of the present disclosure provides a computer readable medium, including a computer readable program code, which will cause an information indication apparatus or a transmitting device to carry out the information indication method as described in Embodiment 1.

An embodiment of the present disclosure provides a computer readable program code, which, when executed in an information indication apparatus or a receiving device, will cause the information indication apparatus or the receiving device to carry out the information indication method as described in Embodiment 2.

An embodiment of the present disclosure provides a computer readable medium, including a computer readable program code, which will cause an information indication apparatus or a receiving device to carry out the information indication method as described in Embodiment 2.

The above apparatuses of the present disclosure may be implemented by hardware, or by hardware in combination with software. The present disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

The method/apparatus described with reference to the embodiments of this disclosure may be directly embodied as hardware, software modules executed by a processor, or a combination thereof. For example, one or more functional block diagrams and/or one or more combinations of the functional block diagrams shown in FIG. 15 may either correspond to software modules of procedures of a computer program, or correspond to hardware modules. Such software modules may respectively correspond to the steps shown in FIG. 5. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in the accompanying drawings may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the accompanying drawings may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

What is claimed is:

1. An information indication apparatus, configured in a transmitting device, the information indication apparatus comprising:
a memory that stores a plurality of instructions; and
a processor coupled to the memory and configured to execute the plurality of instructions to:
transmit a plurality of physical broadcast channels and a plurality of synchronization signals at a plurality of time units or a plurality of time instance within a time interval; wherein, each of the physical broadcast channels indicate timing information of the time interval, the timing information corresponding to a position in time, wherein each of the physical broadcast channels is one to one corresponding to one of the synchronization signals, and there is a predetermined temporal relationship between the physical broadcast channel and the corresponding synchronization signal,
wherein the time interval is a half frame, the timing information of the time interval comprises: a position of the physical broadcast channels in the time interval and a position of the synchronization signals in the time interval,
wherein for a given physical broadcast channel, the timing information of the time interval comprises a position and/or a transmission order of the time unit where the physical broadcast channel is located in the time interval; and
the contents in the physical broadcast channels in the time unit are the same,
wherein the timing information of the time interval is explicitly indicated by one or more bits in payload of the physical broadcast channel.

2. The information indication apparatus according to claim 1, wherein the number of the plurality of physical broadcast channels and the plurality of synchronization signals transmitted at a time interval are configurable.

3. The information indication apparatus according to claim 1, wherein for the given physical broadcast channel, the timing information of the time interval also comprises at least one of:
a transmission time instance of the physical broadcast channel in the time interval; and
a relative time of the time unit where the physical broadcast channel is located or the transmission time instance of the physical broadcast channel relative to a starting position of the time interval.

4. The information indication apparatus according to claim 1, wherein for the given physical broadcast channel, the timing information of the time interval also comprises at least one of:
a position of the time unit where the synchronization signal to which the physical broadcast channel corresponds is located in the time interval; and
a transmission order of the time unit where the synchronization signal to which the physical broadcast channel corresponds is located in the time interval; and
a transmission time instance of the synchronization signal to which the physical broadcast channel corresponds in the time interval; and
a relative time of the time unit where the synchronization signal to which the physical broadcast channel corresponds is located or the transmission time instance of the synchronization signal relative to a starting position of the time interval.

5. The information indication apparatus according to claim 1, wherein each time interval comprises a plurality of time units;
and each time unit comprises any one of the following time resource units: a symbol, a subframe, a frame, and a transmission time interval.

6. The information indication apparatus according to claim 1, wherein the physical broadcast channel and the corresponding synchronization signal are transmitted as formed beams by the transmitting device;

and the formed beams in the time interval are transmitted in identical or different directions at a plurality of configurable time units or time instances by means of time division.

7. The information indication apparatus according to claim 1, wherein each of the plurality of the time units comprise the plurality of time instances; wherein the time units correspond with a range of time and the time instances correspond with a discrete time.

8. The information indication apparatus according to claim 1, wherein the synchronization signal comprises a primary synchronization signal and a secondary synchronization signal.

9. An information indication apparatus, configured in a receiving device, the information indication apparatus comprising:

a memory that stores a plurality of instructions;

a processor coupled to the memory and configured to execute the plurality of instructions to:

detect synchronization signals transmitted by a transmitting device; wherein, the transmitting device transmits a plurality of physical broadcast channels and a plurality of synchronization signals at a plurality of time units or a plurality of time instance within a time interval, and each of the physical broadcast channels indicate timing information of the time interval, the timing information corresponding to a position in time;

receive corresponding physical broadcast channels according to detected synchronization signals; and obtain the timing information of the time interval carried by the physical broadcast channels, wherein each of the physical broadcast channels is one to one corresponding to one of the synchronization signals, and there is a predetermined temporal relationship between the physical broadcast channel and the corresponding synchronization signal, wherein the time interval is a half frame, the timing information of the time interval comprises: a position of the physical broadcast channels in the time interval and a position of the synchronization signals in the time interval, wherein for a given physical broadcast channel, the timing information of the time interval comprises a position and/or a transmission order of the time unit where the physical broadcast channel is located in the time interval; and the contents in the physical broadcast channels in the time unit are the same, wherein the timing information of the time interval is explicitly indicated by one or more bits in payload of the physical broadcast channel.

10. The information indication apparatus according to claim 9, wherein the number of the plurality of physical broadcast channels and the plurality of synchronization signals transmitted at a time interval are configurable.

11. The information indication apparatus according to claim 9, wherein for the given physical broadcast channel, the timing information of the time interval also comprises at least one of:

a transmission time instance of the physical broadcast channel in the time interval; and a relative time of the time unit where the physical broadcast channel is located or the transmission time instance of the physical broadcast channel relative to a starting position of the time interval.

12. The information indication apparatus according to claim 9, wherein for a certain physical broadcast channel, the timing information of the time interval comprises at least one of:

a position of the time unit where the synchronization signal to which the physical broadcast channel corresponds is located in the time interval; and a transmission order of the time unit where the synchronization signal to which the physical broadcast channel corresponds is located in the time interval; and a transmission time instance of the synchronization signal to which the physical broadcast channel corresponds in the time interval; and information on a relative time of the time unit where the synchronization signal to which the physical broadcast channel corresponds is located or the transmission time instance of the synchronization signal relative to a starting position of the time interval.

13. The information indication apparatus according to claim 9, wherein each time interval comprises a plurality of time units;

and each time unit is any one of the following time resource units: a symbol, a subframe, a frame, and a transmission time interval.

14. The information indication apparatus according to claim 9, wherein the physical broadcast channel and the corresponding synchronization signal are transmitted as formed beams by the transmitting device;

and the formed beams in the time interval are transmitted in identical or different directions at a plurality of configurable time units or time instances by means of time division.

15. The information indication apparatus according to claim 9, wherein each of the plurality of the time units comprise the plurality of time instances wherein the time units correspond with a range of time and the time instances correspond with a discrete time.

16. The information indication apparatus according to claim 9, wherein a synchronization signal of the plurality of synchronization signals comprises a primary synchronization signal and a secondary synchronization signal.

17. A communication system, comprising:

a transmitting device configured to transmit a plurality of physical broadcast channels and a plurality of synchronization signals at a plurality of time units or a plurality of time instance within a time interval; wherein, each of the physical broadcast channels indicate timing information of the time interval, the timing information corresponding to a position in time, wherein the time interval is a half frame, the timing information of the time interval comprises: a position of the physical broadcast channels in the time interval and a position of the synchronization signals in the time interval, wherein for a given physical broadcast channel, the timing information of the time interval comprises a position and/or a transmission order of the time unit where the physical broadcast channel is located in the time interval; and the contents in the physical broadcast channels in the time unit are the same, wherein the timing information of the time interval is explicitly indicated by one or more bits in payload of the physical broadcast channel; and a receiving device configured to detect the transmitted synchronization signals, receive corresponding physical broadcast channels according to detected synchronization signals, and obtain the timing information of the time interval carried by the physical broadcast channels, wherein each of the physical broadcast channels is one to one corresponding to one of the synchronization signals, and there is a predetermined temporal relationship between the physical broadcast channel and the corresponding synchronization signal.

18. The communication system according to claim 17, wherein the transmitting device is a base station and the receiving device is a user equipment.

* * * * *